May 8, 1962  J. A. SKUPAS  3,032,804
CASTER BEARING SEAL AND DAMPER
Filed Nov. 20, 1959

INVENTOR.
John A Skupas
BY
Lockwood, Woodard, Smith & Weikart.
ATTORNEYS.

United States Patent Office 3,032,804
Patented May 8, 1962

3,032,804
CASTER BEARING SEAL AND DAMPER
John A. Skupas, Evansville, Ind., assignor to Faultless Caster Corporation, Evansville, Ind., a corporation
Filed Nov. 20, 1959, Ser. No. 854,350
1 Claim. (Cl. 16—36)

This invention relates generally to caster assemblies and in particular to a caster assembly having means for jointly grease sealing the caster bearing and damping the swivel motion of the caster.

In various caster applications, particularly on library and grocery carts, it is desirable to eliminate insofar as possible the fishtailing or shimmying of the casters. Reduction in the noise of operation is also a highly desirable feature in such applications. The present invention is embodied in a caster in which annular seals, formed of a resilient material such as rubber, plastic or the like, are either removably snapped on or rigidly fixed to either or both of the upper and lower ball bearing retainer plates which form part of the caster swivel bearing. The resilient seals act as grease retainers, shimmy dampers and absorbers of a portion of the noise created by coaction of the ball bearings with their adjacent retainer plates.

It is the primary object of the present invention, therefore, to provide a grease sealed caster assembly in which the resilient sealing member acts also as noise absorbing element and a shimmy motion damper.

A further object of the present invention to provide a caster assembly of the type referred to in which the resilient seals are easily removed from the caster assembly to permit steam cleaning or the like of the assembly.

The full nature of the invention will be understood from the accompanying drawings and the following description and claim:

Figure 1:
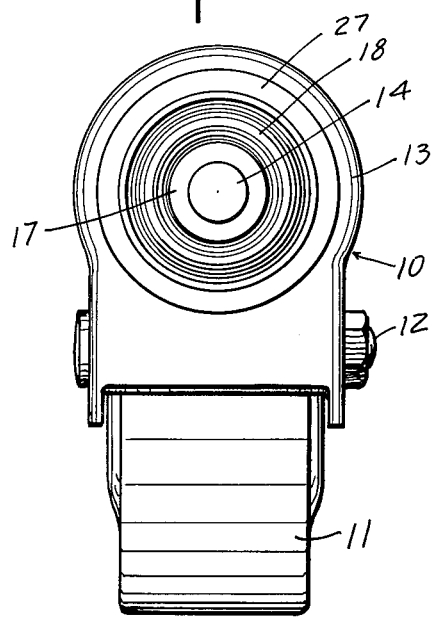
FIG. 1 is a top plan view of the horn and swivel bearing portion of a caster assembly embodying the present invention.
Figure 2:
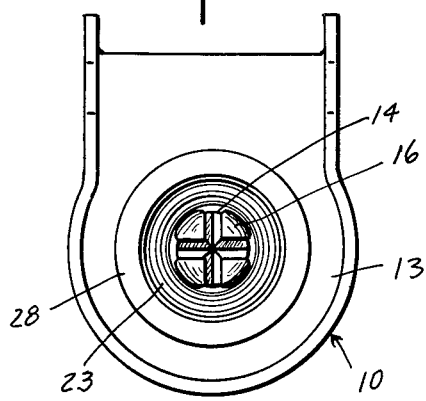
FIG. 2 is a bottom view of the caster assembly with the caster wheel removed.
Figure 3:
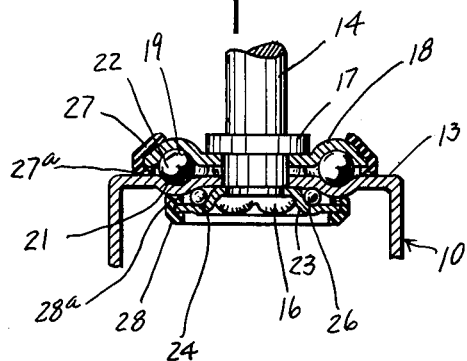
FIG. 3 is a side sectional view of a portion of the caster assembly.

Referring to the drawings, there is shown at 10 a conventional caster supporting horn having depending legs which embrace a caster wheel 11. The caster wheel axle 12 extends through registering apertures in the horn lugs and mounts the caster wheel for rotation. The horizontal top plate 13, forming a part of the horn, is provided with an aperture through which freely extends the lower end of a caster pin 14. The lower end of the pin is staked, as indicated at 16, and has rigidly secured thereto somewhat above its lower end an annular shoulder 17.

The shoulder 17 retains a top bearing retainer or plate 18 which has an annular depression 19 formed therein. The plate 13 forming a part of the horn has an opposed annular depression 21 therein which, together with the depression 19, provides a bearing race for the ball bearings 22.

Adjacent the under face of the plate 13 the pin 14 carries a lower bearing retainer or plate 23, the plate being freely rotatable upon the pin. The plate 23 is provided with an annular depression 24 which cooperates with the plate 13 to provide a bearing race for the ball bearings 26. From the foregoing, it will be understood that the structure so far described provides a double ball bearing swivel joint between the caster housing 10 and the caster pin 14.

To retain grease within the bearing there is provided an annular collar 27, generally U-shaped in cross-section, for the plate 18. The collar may be formed of any suitable, somewhat resilient material, such as rubber, vinyl plastic or other elastomers. The outer margin of the collar is formed so as to provide an annular lip 27a which frictionally engages the adjacent surface of the horn plate 13. While the collar 27 may be rigidly secured to the plate 18 by vulcanizing or similar means, it is preferred that the collar be formed so that its diameter is somewhat less than the diameter of the plate 18, permitting it to be snapped on and off of the plate. In the preferred form, while the collar is not rigidly secured to the plate, in operation it does not move relative thereto. A similar collar 28 having a plate engaging lip 28a is provided for the lower bearing plate 23.

In operation, with the collars installed upon their respective bearing retainer plates, the lips 27a and 28a of the collars will resiliently engage the adjacent surfaces of the horn plate 13 to retain grease adjacent the ball bearings. The frictional engagement of the collars with the horn also serves to resist somewhat the swiveling motion of the horn about the pin 14, this motion resisting characteristic serving to damp any shimmy or cyclically recurring swivel motion. Since the collars are formed of a relatively soft, somewhat resilient material, they further function to damp or absorb sound generated in the bearing assembly during operation. In the servicing of grocery carts which utilize casters of the type herein described, it is customary to periodically service the carts by steam cleaning, relubrication of the casters, etc. The grease seal caster herein described is particularly adapted for such applications because the collars 27 and 28 may be easily removed prior to the steam cleaning operation and new collars or seals installed after the cleaning operation.

While the foregoing has described a caster assembly of the double ball bearing type, it will be understood that the advantages of the present invention are equally applicable to casters having a single bearing construction and the advantages may be achieved in part at least, in double ball bearing structures wherein a sealing collar is used upon only one of the bearing plates.

While the invention has been disclosed and described in some detail in the drawings and foregoing description, they are to be considered as illustrative in character, as modifications may readily suggest themselves to persons skilled in this art and within the broad scope of the invention, reference being had to the appended claim.

The invention claimed is:

In a caster having a wheel supporting horn including a horizontally disposed plate, a swivel plate pivotally supported adjacent said horn plate, bearing means disposed between said swivel plate and said horn plate, and bearing-grease retaining seal means carried by said swivel plate, said seal means comprising a collar formed of a resilient material such as rubber, said collar being generally U-shaped in cross-section and thereby having an internal circumferential groove, said groove accommodating the marginal edge portion of said swivel plate, the portion of said collar on the one side of said groove adjacent said horn plate having an extending lip which frictionally engages the adjacent surface of said horn plate to retain grease adjacent said bearing means and to provide a frictional force resisting relative motion of said swivel plate and horn plate, said collar further serving to absorb noise generated by functioning of said bearing means.

References Cited in the file of this patent
UNITED STATES PATENTS

| | | |
|---|---|---|
| 1,341,630 | Chesnutt | June 1, 1920 |
| 2,617,668 | Stewart | Nov. 11, 1952 |
| 2,787,804 | Noelting | Apr. 9, 1957 |
| 2,887,330 | Cobb | May 19, 1959 |
| 2,914,340 | Black | Nov. 24, 1959 |
| 2,947,021 | Black | Aug. 2, 1960 |